United States Patent
Patterson et al.

(10) Patent No.: US 9,884,413 B2
(45) Date of Patent: Feb. 6, 2018

(54) SOCKET RETAINING TOOL USING A SPRING-LOADED KEEPER SLEEVE

(71) Applicants: Laura Patterson, Joliet, IL (US); Douglas John Francis, Sr., Wilmington, IL (US); Douglas John Francis, Jr., Wilmington, IL (US)

(72) Inventors: Laura Patterson, Joliet, IL (US); Douglas John Francis, Sr., Wilmington, IL (US); Douglas John Francis, Jr., Wilmington, IL (US)

(73) Assignee: Power House Tool, Inc., Joliet, IL (US)

( * ) Notice: Subject to any disclaimer, the term of this patent is extended or adjusted under 35 U.S.C. 154(b) by 70 days.

(21) Appl. No.: 14/503,958

(22) Filed: Oct. 1, 2014

(65) Prior Publication Data
US 2016/0096257 A1   Apr. 7, 2016

(51) Int. Cl.
*B25B 23/00* (2006.01)
*B23B 31/107* (2006.01)

(52) U.S. Cl.
CPC ...... *B25B 23/0035* (2013.01); *B25B 23/0021* (2013.01); *B23B 31/107* (2013.01)

(58) Field of Classification Search
CPC ..... B25B 31/06; B25B 13/02; B25B 23/0035; B25B 23/1427; B25B 13/06; B23B 31/107
See application file for complete search history.

(56) References Cited

U.S. PATENT DOCUMENTS

| | | | | |
|---|---|---|---|---|
| 5,943,924 A | * | 8/1999 | Jarvis | B25B 23/0021 81/177.2 |
| 8,651,764 B2 | * | 2/2014 | Lin | B25B 23/0021 403/322.2 |
| 2004/0126182 A1 | * | 7/2004 | Lin | B25B 23/0021 403/322.2 |
| 2009/0049959 A1 | * | 2/2009 | Gibbs | B25B 13/06 81/180.1 |

* cited by examiner

*Primary Examiner* — Sunil K Singh
*Assistant Examiner* — Paul M Janeski
(74) *Attorney, Agent, or Firm* — Greer, Burns & Crain Ltd.

(57) ABSTRACT

A socket retaining tool for preventing separation of a socket from a drive shaft of a driving tool. A keeper sleeve is configured to accommodate insertion and reciprocal movement of a quick change adapter and a quick change sleeve under the action of a biasing member. The quick change adapter has a male end and an opposite female end. The male and female ends are constructed and arranged to be used with locking mechanisms such that the socket is connected to the male end, and the drive shaft is connected to the female end. A socket locking mechanism coupled to the male end is enclosed by the keeper sleeve, and a driver locking mechanism coupled to the female end is enclosed by the quick change sleeve, when the socket retaining tool is in a relaxed position, thereby avoiding unwanted release of the locking mechanisms.

18 Claims, 12 Drawing Sheets

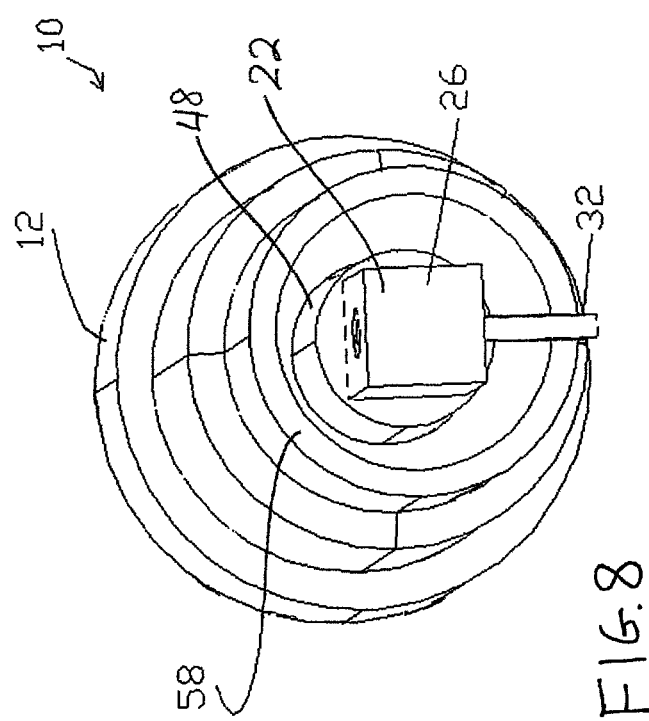

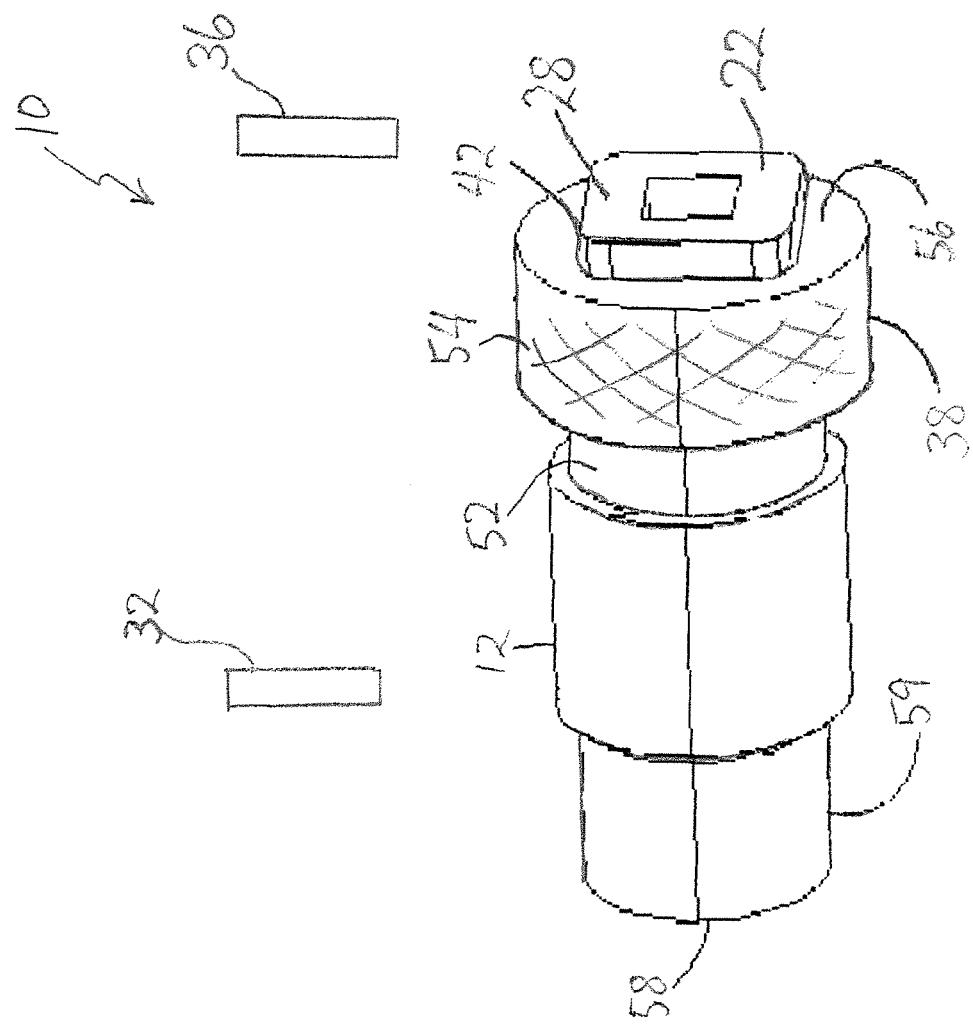

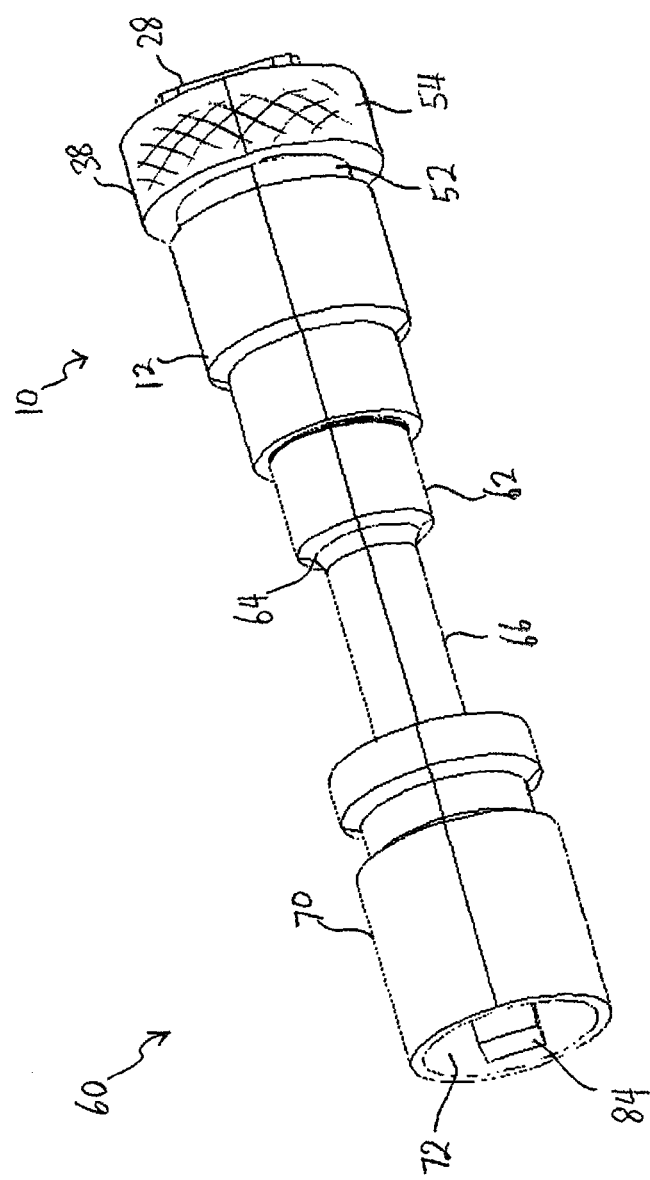

SOCKET RETAINING TOOL USING A SPRING-LOADED KEEPER SLEEVE

BACKGROUND OF THE INVENTION

The present disclosure generally relates to tools to be used with sockets and socket driving tools for fastening and removing nuts from bolts or threaded studs. In particular, the present disclosure relates to a socket retaining tool that positively locks the socket to the driving tool for preventing inadvertent separation of the socket from the driving tool.

Conventional sockets used for attaching and removing nuts are well known in the art. Typically, the socket has a non-circular opening at one end, such as a hex-shaped opening for receiving the nut such that the nut freely moves into and out of the opening. At an opposite end of the socket, another non-circular opening, such as a square-shaped opening, is provided for receiving a drive shaft of the driving tool so that a driving force is transmitted to the socket from a motor of the driving tool. A conventional quick release and locking mechanism using a spring-loaded locking bearing ball can be incorporated for connecting the socket and the drive shaft.

However, such locking mechanisms allow for unintentional separation or partial dislodgment of the socket from the drive shaft during operation. For example, when an axial force is applied to the socket or the drive shaft, a radial force of the locking bearing ball is overcome, and the socket is released from the drive shaft. In some applications, the unintentional separation or partial dislodgment of the socket from the drive shaft can cause serious problems, particularly if the socket is dropped into an inaccessible area or an adjacent moving part. If the dropped socket is allowed remaining in the area, the dropped socket may cause damage when the operation of machinery is continued or resumed subsequently.

In most known arrangements, retainer pins are utilized to retain the socket on the tool, with the pins being held in place by O-rings. Although there is an O-ring that has a plastic extension as part of its design for eliminating the pin, the O-ring is installed after the pin is inserted as a mere O-ring. In certain cases, these conventional pins and O-rings are used with a locking pin, but they fail to securely hold the pins in the driving tools. Therefore, there is a need for developing an improved socket locking or retaining tool that prevents unwanted separation of the socket or retainer pins from the drive shaft such that the damage to the associated machinery is avoided.

SUMMARY OF THE INVENTION

The above-identified need is met by the present socket retaining tool, in which the present retaining tool positively locks a socket to a driving tool to prevent unintentional separation of the socket from a drive shaft of the driving tool.

The socket retaining tool prevents separation of the socket from the drive shaft of a driving tool with a combination of parts including a keeper sleeve configured to accommodate insertion and reciprocal movement of a quick change adapter and a quick change sleeve under the action of a biasing member. The quick change adapter has a male end and an opposite female end. The male and female ends are constructed and arranged to be used with locking mechanisms such that the socket is connected to the male end of the quick change adapter using a socket locking mechanism, and the drive shaft of the driving tool is connected to the female end of the quick change adapter using a driver locking mechanism. The socket locking mechanism coupled to the male end is enclosed by the keeper sleeve, and the driver locking mechanism coupled to the female end is enclosed by the quick change sleeve, when the socket retaining tool and the biasing member are in a relaxed position, thereby avoiding unwanted release of the locking mechanisms.

More specifically, the present socket retaining tool includes the quick change sleeve and the quick change adapter, where the quick change adapter is inserted into the quick change sleeve and is slidably movable within the keeper sleeve in a longitudinal axis of the keeper sleeve. A first bore is provided at one end of the quick change adapter for connecting to the socket with a retainer pin, and a second bore is provided at an opposite end of the quick change adapter for connecting to the drive shaft of the driving tool, thereby positively locking the socket to the driving tool using the present socket retaining tool. As a result, unwanted or unintentional separation of the socket from the drive shaft is prevented even when the axial force is inadvertently applied to the driving tool during use.

Another important advantage is that the quick change adapter secures the socket to the present retaining tool upon the insertion of the retainer pin into the first bore, and the quick change adapter also secures the drive shaft to the present retaining tool upon the insertion of the retainer pin into the second bore such that the present socket retaining tool is sandwiched between the socket and the drive shaft. The first bore and the second bore are both completely enclosed by the keeper sleeve when the present retaining tool is in a relaxed position so that the retainer pins remain in a space defined by inner surfaces of the keeper sleeve and therefore are unable to become unintentionally detached from the retaining tool.

On the other hand, when the present retaining tool is in one of two different compressed positions, the retainer pins may be alternately removed from the corresponding bores to release the socket and the drive shaft from the driving tool. Both the quick change sleeve and the quick change adapter can transition between the relaxed position and the compressed positions relative to the keeper sleeve.

In another embodiment, it is contemplated that the quick change adapter can be replaced with an extension shaft for interconnecting the present retaining tool and the drive shaft of the driving tool at a predetermined distance. As described in greater detail below, these advantages are achieved by the present socket retaining tool.

The foregoing and other aspects and features of the disclosure will become apparent to those of reasonable skill in the art from the following detailed description, as considered in conjunction with the accompanying drawings.

BRIEF DESCRIPTION OF THE DRAWINGS

FIG. 8 is a left end view of the socket retaining tool of FIG. 7;

FIG. 9 is a side perspective view of the socket retaining tool of FIG. 1 in the extended position, showing the retainer pins removed from the female end bore and the male end bore of the quick change adapter;

FIG. 10C is a perspective view of the present socket retaining tool of FIG. 10B.

DETAILED DESCRIPTION OF THE PREFERRED EMBODIMENTS

Figure 1:
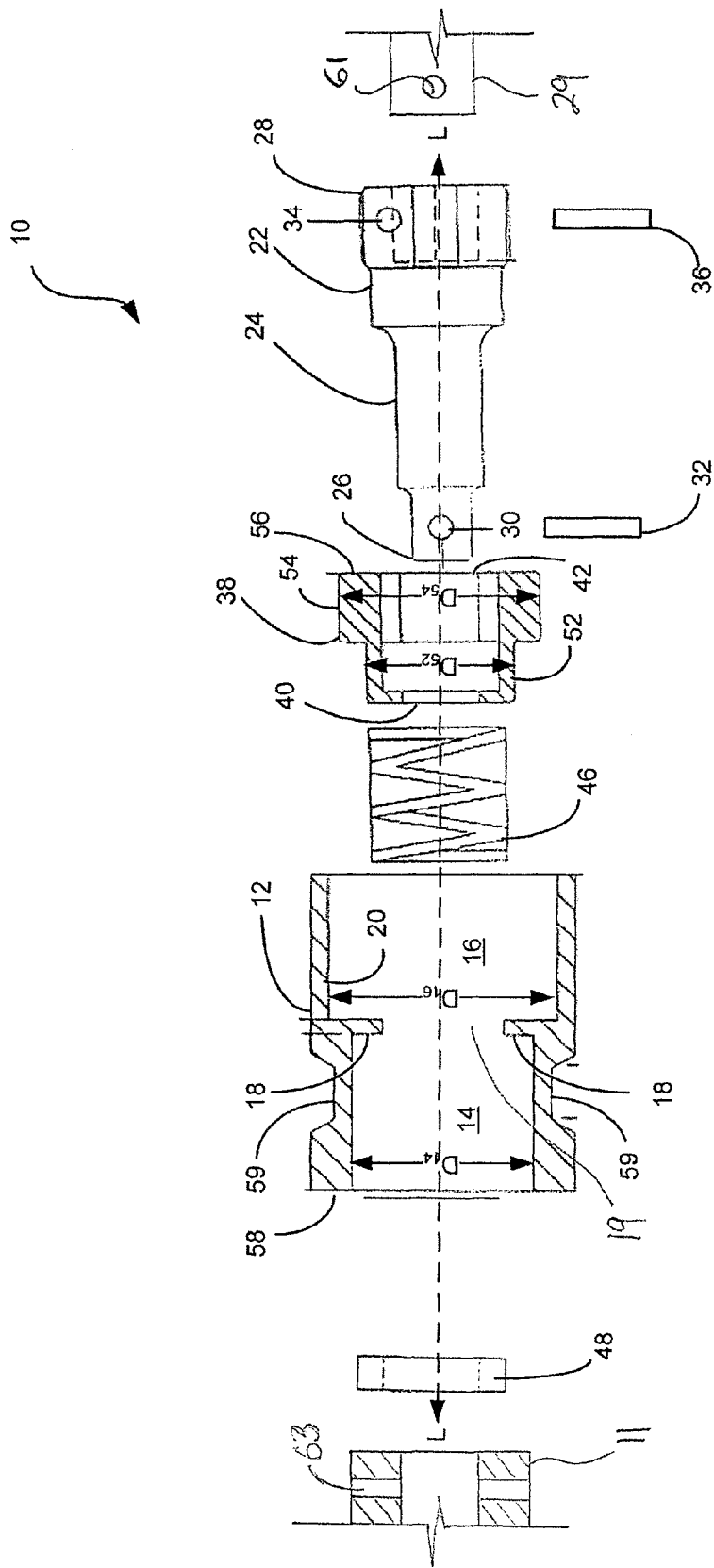
FIG. 1 is an exploded vertical cross sectional view of the present socket retaining tool, featuring a keeper sleeve, a quick change sleeve, and a quick change adapter.

Referring now to FIG. 1, the present socket retaining tool is generally designated 10 and is designed for positively attaching and locking a socket 11 to a drive shaft 29 of a driving tool for preventing inadvertent separation of the socket from the driving tool. Included in the retaining tool 10 is a keeper sleeve 12 having a first or left chamber 14 and a second or right chamber 16. A stop wall 18 having a central opening 19 extends radially from an inner surface 20 of the keeper sleeve 12 toward a longitudinal axis L of the keeper sleeve to separate the first and second chambers 14, 16. The first chamber 14 is connected to the second chamber 16 for receiving a biasing member 46, a quick change sleeve 38, and a quick change adapter 22.

In a preferred embodiment, the quick change adapter 22 has an elongate body 24, a male end 26 at one end, and a female end 28 at an opposite end. An exterior (or external) diameter of the male end 26 is preferably smaller than the exterior (or external) diameter of the female end 28. For example, the male end 26 is configured for connecting to the socket 11, and the female end 28 has a cavity or opening and is dimensioned and configured for connecting to the drive shaft 29 of the driving tool.

More specifically, a male end cross bore 30, perpendicular to the longitudinal axis L, is provided at the male end 26 of the quick change adapter 22 for receiving a first retainer pin 32, and a female end cross bore 34, perpendicular to the longitudinal axis L, is provided at the female end 28 of the quick change adapter for receiving a second retainer pin 36. While a cylindrical shape is shown for illustration purposes, other suitable types of pins are also contemplated. An important aspect of the male and female end cross bores 30, 34 is that the male bore 30 is fully covered by and enclosed (or encapsulated) in the left chamber 14 of the keeper sleeve 12, and the female bore 34 is similarly fully covered by and enclosed in the quick change sleeve 38, such that the first and second retainer pins 32, 36 are securely held in place when the present retaining tool 10 is in a relaxed position. This configuration allows the retainer pins 32, 36 to be securely enclosed or encapsulated by the sleeve 12 for positively securing the pins and preventing the pins from falling into adjacent machinery. During use, the retainer pin 32 is securely held by the sleeve 12, and the pin 36 is securely held by the quick change sleeve 38. As a result, the retainer pins 32, 36 stay in the tool 10 with the sleeve 12 and the quick change sleeve 38, and thus effectively eliminate the need for a conventional O-ring or C-clamp.

It is contemplated that the quick change sleeve 38 is provided for completely enclosing the female end 28 of the quick change adapter 22, thereby covering the female end cross bore 34 when the present socket retaining tool 10 is fully assembled. Similarly, the first chamber 14 of the keeper sleeve 12 completely encloses the male end 26 and covers the male end cross bore 30 of the quick change adapter 22 when assembled. Both cross bores 30, 34 are disposed perpendicular to the longitudinal axis of the elongate body 24 of the quick change adapter 22. As discussed in greater detail below, when the quick change sleeve 38 is connected to the driving tool 29, such as an impact gun or the like, a driver locking mechanism is provided, which may be in the form of the second retainer pin 36 extending through cross bores in the female end 28 of the quick change adapter 22 and the drive shaft of the driving tool with the pin being surrounded by inner surfaces of the quick change sleeve 38 such that the retainer pin is securely retained or held in place during operation of the driving tool. Thus, the quick change sleeve 38 prevents the second retainer pin 36 from escaping from the female end cross bore 34 due to vibrations or external impacts. Similarly, a socket locking mechanism is provided which may be in the form of the first retainer pin 32 extending through cross bores in the male end 26 of the quick change adapter 22 and the socket with the pin being surrounded by inner surfaces of the keeper sleeve 12 such that the retainer pin is securely retained or held in place during operation of the driving tool. Another important aspect of the retainer pins 32, 36 is that this configuration of the present tool 10 eliminates or reduces the risk of pin breakage due to axial impacting forces transferred to the pins during impact operation, and further reduces the risk of subsequent separation of parts in the tool along with the broken pin fragments. For example, the present tool 10 ensures that a face of the drive shaft 29 of the driving tool and an inner face of the female end 28 of the quick change adapter meet with full contact, and thus no stress is applied directly to the pins 36 during operation.

In a preferred embodiment, the quick change sleeve 38 has a first opening 40 configured for accommodating axial movement of the male end 26 of the quick change adapter 22 within the first opening, and a second opening 42 configured for accommodating axial movement of the female end 28 of the quick change adapter within the second opening, where the first opening is smaller than the second opening, and the exterior diameter of the female end, such that the female end is prevented from entering into the first opening of the quick change sleeve.

It is also preferred that the first and second retainer pins 32, 36 have substantially the same length and shape. It is also contemplated that pin lengths are determined based on an outer diameter of an extension shaft 62, an inner diameter of the first chamber 14, and a diameter of the female end cross bore 34 with a calculation of drive size and keeper sleeve diameter. For example, the first retainer pin 32 is sized to loosely fit within an interior diameter of the male end cross bore 30, and the second retainer pin 36 is sized to loosely fit within an interior diameter of the female end cross bore 34.

It is contemplated that the keeper sleeve 12 is biased for actuation of the quick change adapter 22 and the quick change sleeve 38. Preferably, the keeper sleeve 12 has the biasing member 46 which may be in the form of a chamber spring for actuation of the quick change sleeve 38. More specifically, during assembly of the present retaining tool 10, the male end 26 of the quick change adapter 22 is first inserted into the second opening 42 of the quick change sleeve 38, thereby extending out of the first opening 40. Other suitable types of the biasing member 46 are also contemplated, such as elastomeric cylindrical blocks, torsion springs, twin springs, and the like as known in the art.

Next, the male end 26 is slidably inserted into the chamber spring 46 and both are inserted into the second chamber 16 of the keeper sleeve 12 until the chamber spring abuts against the stop wall 18 of the keeper sleeve 12. At this point, the elongate body 24 of the quick change adapter 22 is extended into the first chamber 14 of the keeper sleeve 12. A press ring 48 having an internal diameter that is slightly smaller than an exterior diameter of the elongate body 24 of the quick change adapter 22 can be fixedly disposed on the elongate body near the male end 26. Specifically, the press ring 48 is slipped onto the male end 26 of the quick change adapter 22 and is pressed onto the elongate body 24 with a tight and secure friction or interference fit.

For axial movement of the quick change adapter 22 within the keeper sleeve 12, an external diameter of the press ring 48 is slightly smaller than an interior diameter $D_{14}$ of the first chamber 14 so that the press ring 48 can slidably reciprocate with the quick change adapter within the first chamber.

While the interior diameter $D_{14}$ of the first chamber 14 is shown for illustration purposes as being smaller than the interior diameter $D_{16}$ of the second chamber 16, the interior diameters of the first and second chambers 14, 16 can vary to suit different applications.

As for the quick change sleeve 38, an exterior diameter $D_{52}$ of a first or narrower region 52 of the quick change sleeve 38 is smaller than the interior diameter $D_{16}$ of the second chamber 16 so that the narrower region slidably reciprocates within the second chamber. However, the exterior diameter $D_{54}$ of a second or wider region 54 of the quick change sleeve 38 is larger than the interior diameter $D_{16}$ of the second chamber 16 such that the wider region limits the axial reciprocating movement of the narrower region 52. An exterior diameter of the chamber spring 46 is larger than an interior diameter of the central opening 19 of the stop wall 18 so that the spring abuts against the stop wall.

It is preferred that an exterior perimeter (or diameter) of the female end 28 of the quick change adapter 22 is smaller than an interior perimeter (or diameter) of the second opening 42 of the quick change sleeve 38 so that the quick change sleeve can slide over the female end of the quick change sleeve. Although square-shaped perimeters are shown for the female end 28 and the second opening 42, other configurations are also contemplated. It is also preferred that any type of knurling or textured ribs, ridges, grooves, or bumps are contemplated for disposition as a friction formation on an outer surface of the wider region 54 for enhancing gripping power. It is contemplated that the second opening 42 of the quick change sleeve 38 has a noncircular shape, such as a square, for slidingly receiving the quick change adapter 22 so that an operator can activate the quick change sleeve 38 in a confined or restricted area. Perimeters of the female end 28 of the quick change adapter 22 and the second opening 42 of the quick change sleeve 38 are square-shaped to allow the outer surface of the wider region 54 to be used for rotating the quick change adapter by gripping the knurled surface of the wider region 54, and manually spinning the socket 11 without force expelled by the driving tool 29. This configuration provides a controlled force and amount of rotation manually.

Figure 2:
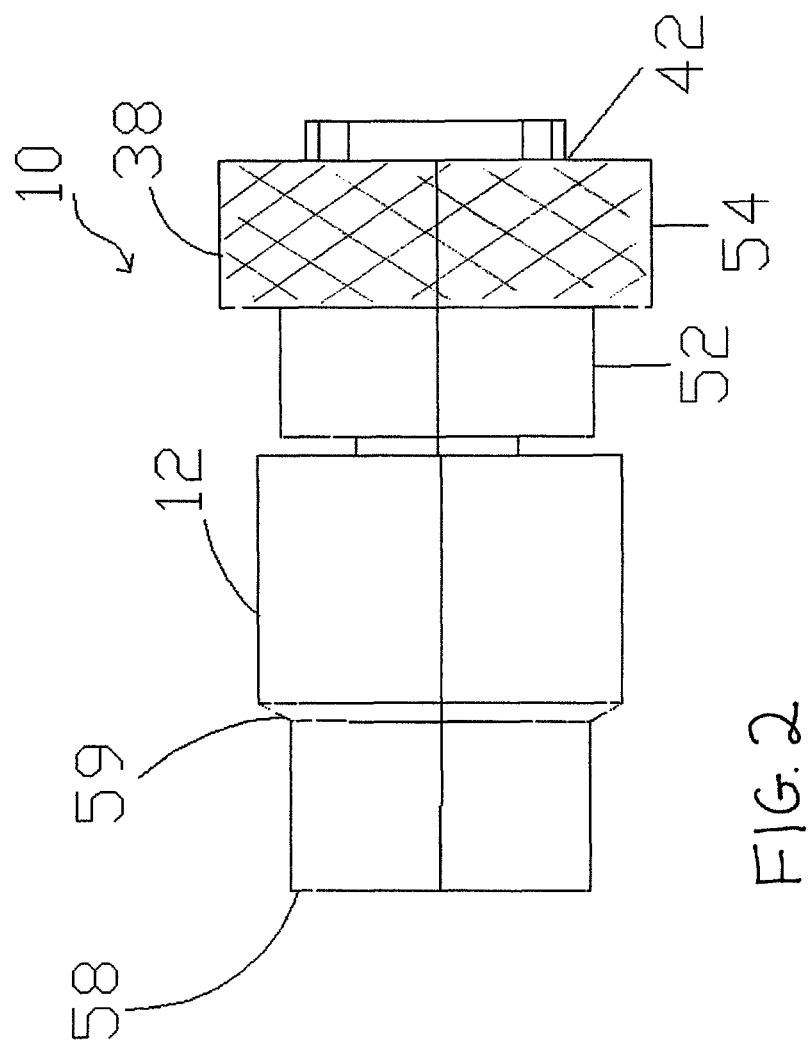
FIG. 2 is a side view of the socket retaining tool of FIG. 1 in an extended position.
Figure 3:
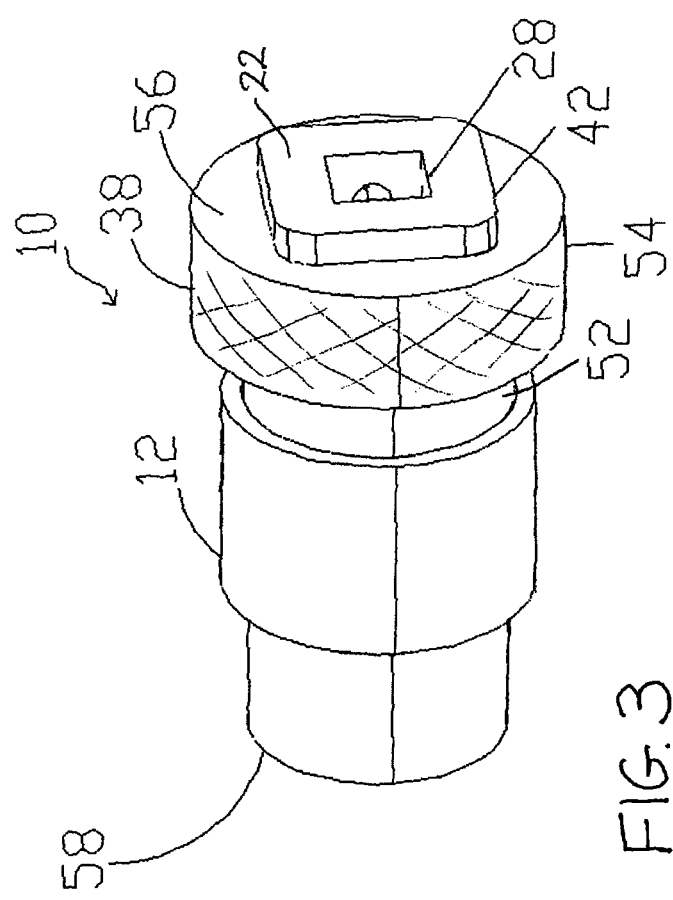
FIG. 3 is a right end perspective view of the socket retaining tool of FIG. 2.

Referring now to FIGS. 1-3, when the socket retaining tool 10 is assembled as described above, the chamber spring 46 biases the quick change sleeve 38 away from the stop wall 18 to the right such that an end face 56 surrounding the second opening 42 of the quick change sleeve 38 is substantially flush with an end face of the female end 28 of the quick change adapter 22 when the chamber spring 46 moves to a relaxed position. An end face of the male end 26 of the quick change adapter 22 is also substantially flush with an end face 58 of the first or left chamber 14 of the keeper sleeve 12 in the relaxed position. An orientation of the left and right sides refers to a corresponding direction toward the first or left chamber 14 and the second or right chamber 16 relative to the stop wall 18 as shown in FIG. 1.

Figure 4:
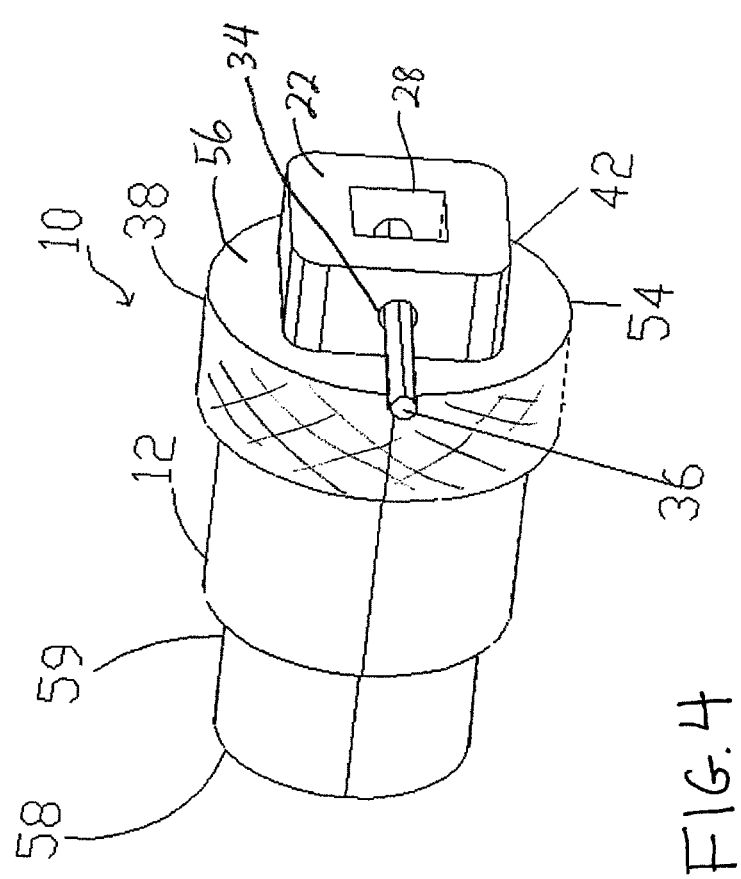
FIG. 4 is a right end perspective view of the socket retaining tool of FIG. 1 in a sleeve retracted position, showing a retainer pin half inserted into a female end bore of the quick change adapter.
Figure 5:
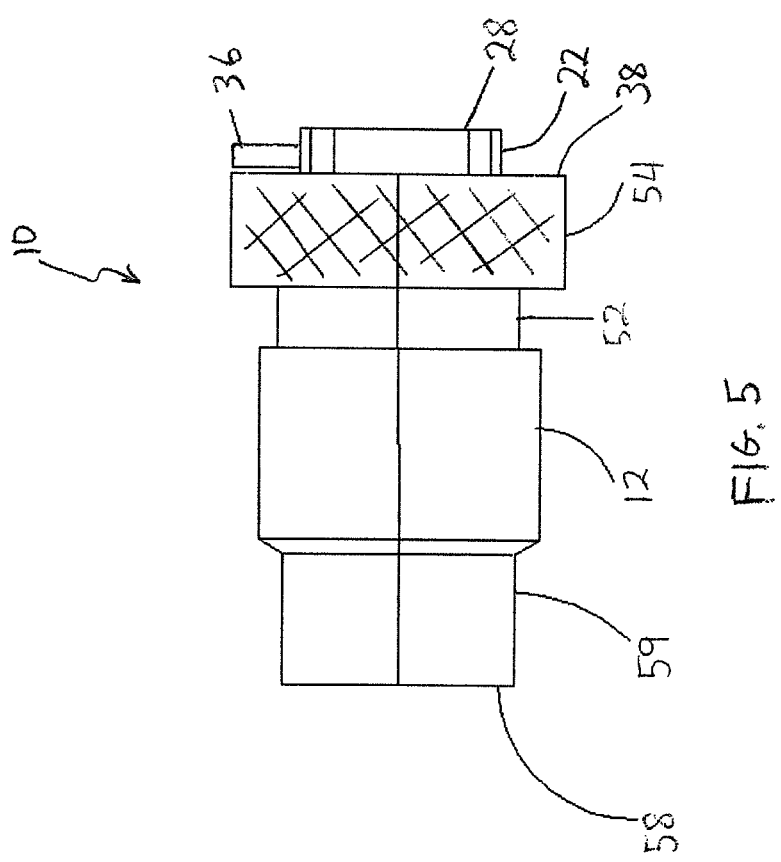
FIG. 5 is a side view of the socket retaining tool of FIG. 4, showing the half inserted retainer pin oriented downwardly.
Figure 6:
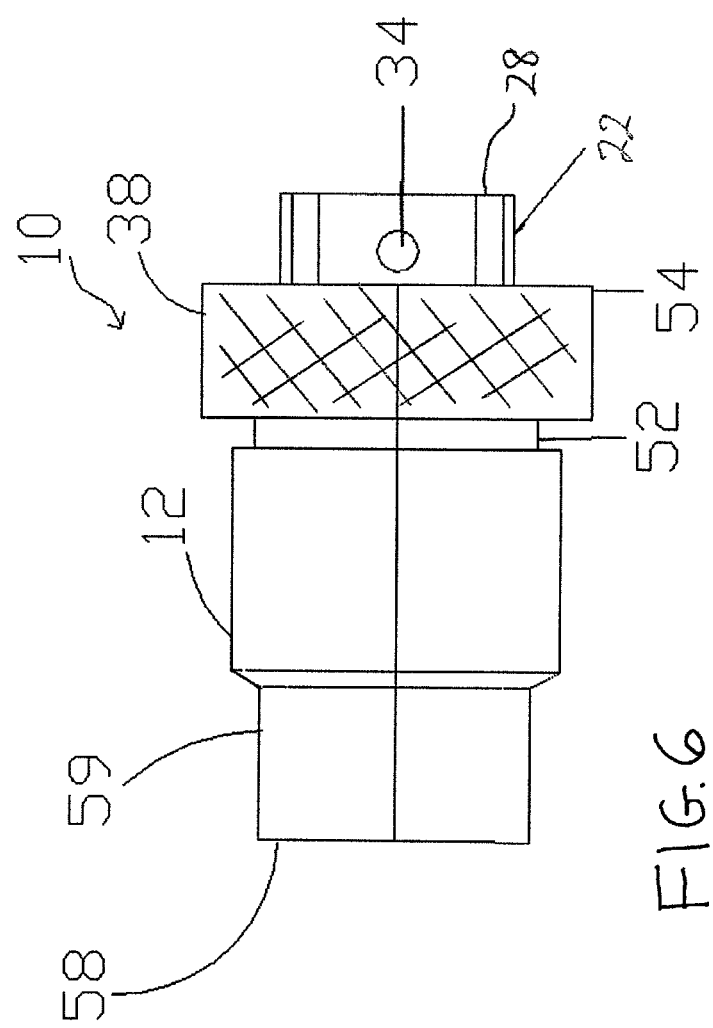
FIG. 6 is a side view of the socket retaining tool of FIG. 4, showing the female end bore of the quick change adapter.

Referring now to FIGS. 4-6, it is contemplated that both the quick change sleeve 38 and the quick change adapter 22 can individually transition between an extended position and a retracted position relative to the keeper sleeve 12. More specifically, when the quick change sleeve 38 is depressed into the second chamber 16 of the keeper sleeve 12 by compressing the chamber spring 46, the socket retaining tool 10 is in a first compressed position being a sleeve retracted position. For example, a user firmly holds the knurled wider region 54 of the quick change sleeve 38 and a grasping area 59 of the keeper sleeve 12, and manually moves the quick change sleeve 38 into the second chamber 16 against the biasing force of the chamber spring 46, while holding the quick change adapter 22 stationary relative to the keeper sleeve. This action causes the female end 28 of the quick change adapter 22 to become exposed to the right of the quick change sleeve 38, thereby exposing the female end cross bore 34. As a result, the quick change sleeve 38 can move along the longitudinal axis of the elongate body 24 of the quick change adapter 22.

When the female end cross bore 34 is exposed, the drive shaft 29 of the driving tool can be inserted into the female end 28, and the second retainer pin 36 can be subsequently inserted into the female end cross bore 34 and through an aligned cross bore 61 in the end of the drive shaft to positively lock and interconnect the drive shaft and the quick change adapter 22. When the quick change sleeve 38 is released to the right, the chamber spring 46 relaxes and the socket retaining tool 10 transitions into a sleeve extended position which is also the relaxed position of the socket retaining tool.

Specifically, the quick change sleeve 38 is extended to the right relative to the quick change adapter 22 by the biasing action of the chamber spring 46, thereby enclosing the female end 28 of the elongate body 24 within the second opening 42 of the quick change sleeve 38. At this point, the second retainer pin 36 is securely captured within the quick change sleeve 38, and the quick change adapter 22 remains locked onto the drive shaft 29 of the driving tool. It is contemplated that a driver locking mechanism is comprised of the second retainer pin 36, the female end 28 of the elongate body 24, and the quick change sleeve 38. The driver locking mechanism coupled to the female end 28 is enclosed by the quick change sleeve 38 when the socket retaining tool 10 and the chamber spring 46 are in the relaxed position.

Figure 7:
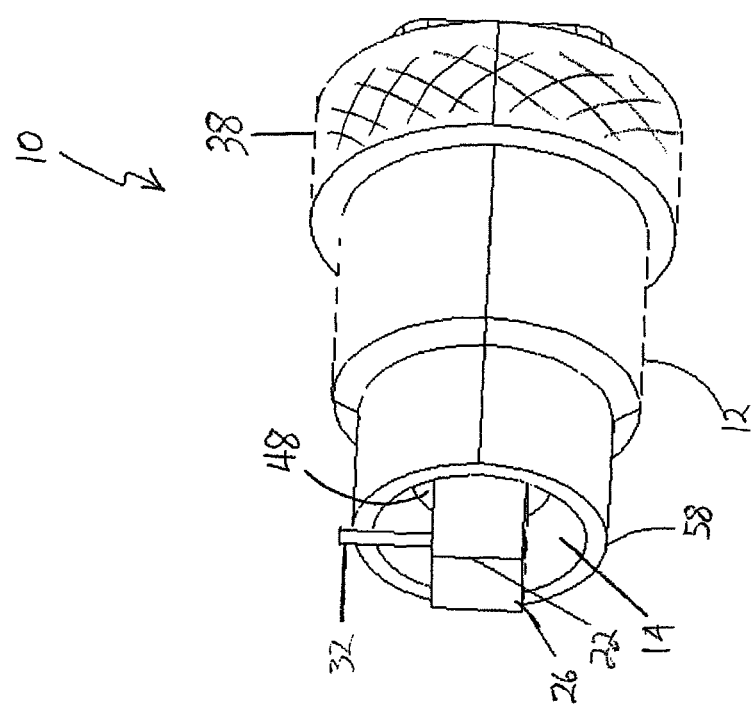
FIG. 7 is a left end perspective view of the socket retaining tool of FIG. 1 in an adapter male end extended position, showing the retainer pin half inserted into a male end bore of the quick change adapter.

Referring now to FIGS. 7 and 8, when the quick change adapter 22 and the quick change sleeve 38 are depressed into the second chamber 16 of the keeper sleeve 12 together, again compressing the chamber spring 46 in a second compressed position, the socket retaining tool 10 is in an adapter male end extended position. For example, a user manually presses the female end 28 of the quick change adapter 22 and the quick change sleeve 38 into the second chamber 16 relative to the keeper sleeve 12 against the biasing force of the chamber spring 46. This action causes the quick change sleeve 38 to slide into the second chamber 16, and simultaneously causes the male end 26 of the quick change adapter 22 to become exposed to the left of the keeper sleeve 12, thereby exposing the male end bore cross 30.

When the male end cross bore 30 is exposed, the socket 11 can be slipped onto the male end 26, and the first retainer pin 32 can be subsequently inserted into a cross bore 63 in the socket 11 and into the male end cross bore to positively lock and interconnect the socket and the quick change adapter 22. When the quick change adapter 22 is released, the chamber spring 46 relaxes and the socket retaining tool 10 transitions back into the relaxed position. Specifically, the quick change adapter 22 and the attached socket 11 are retracted into the first chamber 14 of the keeper sleeve 12 by the relaxing action of the chamber spring 46. Further, the quick change adapter 22 and the quick change sleeve 38 move to the right relative to the keeper sleeve 12 by the relaxing action of the chamber spring 46.

As a result, the male end 26 of the elongate body 24 is fully enclosed within the first chamber 14 of the keeper sleeve 12. At this point, the first retainer pin 32 is securely captured within the first chamber 14, and the quick change adapter 22 remains locked onto the socket 11. It is contemplated that a socket locking mechanism is comprised of the first retainer pin 32, the male end 26 of the elongate body 24, and the keeper sleeve 12. The socket locking mechanism coupled to the male end 26 is enclosed by the keeper sleeve 12 when the socket retaining tool 10 and the chamber spring 46 are in the relaxed position. Although both the socket and driver locking mechanisms are using the retainer pins 32, 36, other suitable types of locking mechanisms or security devices are also contemplated, such as ball bearing locks, hooks, clasps, spring locks, lobster claws, and the like as known in the art.

Referring now to FIG. 9, the socket retaining tool 10 is illustrated in the relaxed position, separately showing the first and second retainer pins 32, 36 removed from the male end cross bore 30 and the female end cross bore 34 of the quick change adapter 22. It is also contemplated that the first and second retainer pins 32, 36 can be stored in the male and female end cross bores 30, 34 for subsequent use.

Figure 10A:
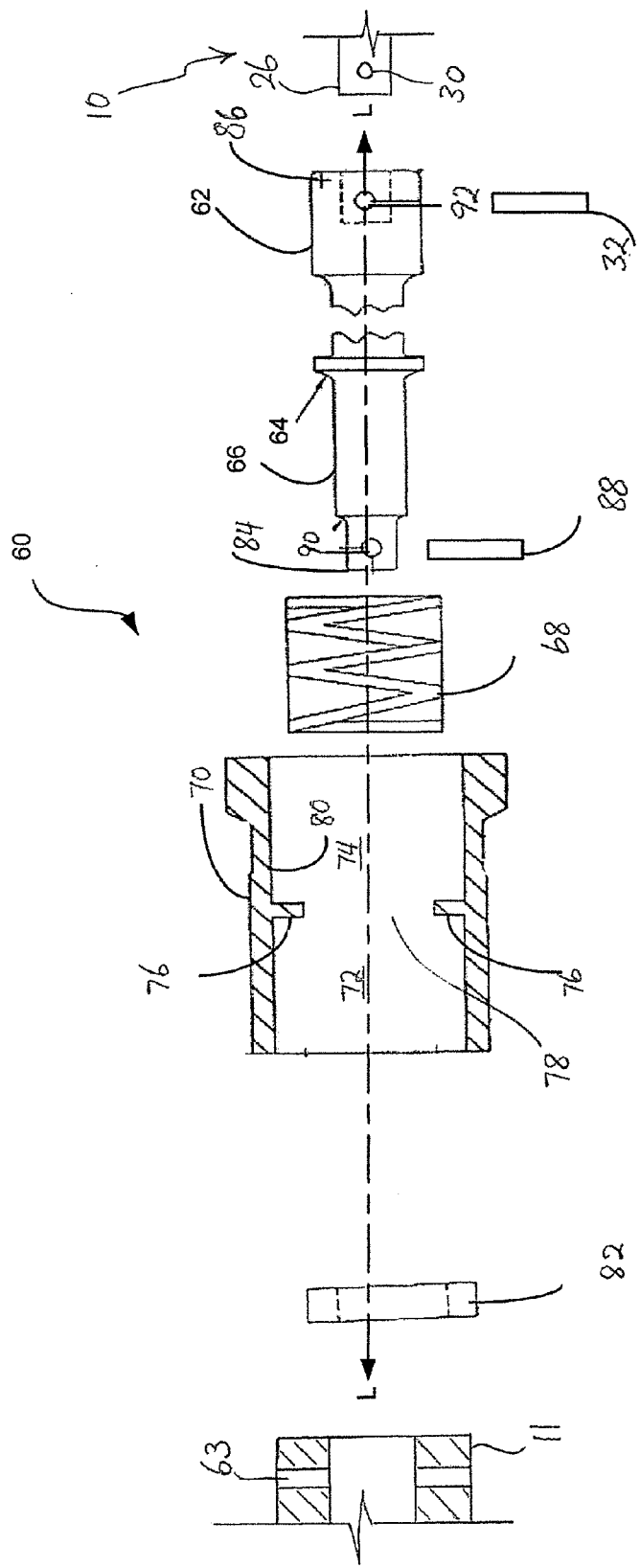
FIG. 10A is an exploded vertical sectional view of the present socket retaining tool, featuring an extension shaft assembly.

Referring now to FIG. 10A, an exemplary extension shaft assembly of the socket retaining tool 10 is generally designated 60. The extension shaft assembly 60 is optionally used with the socket retaining tool 10 for providing increased reach of the driving tool in confined or restricted areas. Included in the extension shaft assembly 60 is an extension shaft 62 having a similar configuration as the quick change adapter 22, which is provided for interconnecting the retaining tool 10 with the socket 11. Further, a flange 64 extending outwardly from an outer circumferential surface of an elongate body 66 of the extension shaft 62 is provided for bearing against an extension chamber spring 68.

In a preferred embodiment, the extension chamber spring 68 operates similarly to the chamber spring 46. More specifically, as is constructed and arranged similarly to the keeper sleeve 12, an extension keeper sleeve 70 is included in the extension shaft assembly 60, and has a first or left extension chamber 72 and a second or right extension chamber 74. An extension stop wall 76 having a central opening 78 extends radially from an inner surface 80 of the extension keeper sleeve 70 toward a longitudinal axis L of the extension keeper sleeve to separate the first and second chambers 72, 74. An extension press ring 82 having an internal diameter that is slightly smaller than an exterior diameter of the elongate body 66 of the extension shaft 62 so that the extension press ring can be fixedly disposed on the elongate body near an extension male end 84 using a tight friction or interference fit.

In this arrangement, when the extension shaft 62 is depressed into the second extension chamber 74 of the extension keeper sleeve 70 by a compression of the extension chamber spring 68, the extension shaft assembly 60 is in an extension retracted position. For example, a user manually presses an extension female end 86 of the extension shaft 62 toward the extension second chamber 74 relative to the extension keeper sleeve 70 against the biasing force of the extension chamber spring 68. This action causes the extension shaft 62 to slide to the left into the extension second chamber 74, and simultaneously causes the extension male end 84 of the extension shaft 62 to become exposed to the left of the extension keeper sleeve 70, thereby exposing the extension male end 84 such that the male end can connect to the socket 11 or another extension unit 60. For example, the extension male end 84 of the extension shaft 62 can connect to the socket 11, and the male end 26 of the quick change adapter 22 can be inserted into the opening of the extension female end 86 of the extension shaft 62.

When the extension male end 84 is exposed, the socket 11 can be slipped onto the extension male end and secured by inserting an extension retainer pin 88 through the cross bore 63 of the socket and an extension male end bore 90 of the extension shaft 62. Similarly, the socket retaining tool 10 can be connected to the extension shaft assembly 60 and secured by inserting the first retainer pin 32 through an extension female end bore 92 of the extension shaft 62 and the male end bore 30 of the quick change adapter 22. In other words, the extension female end 86 of the extension shaft 62 can act as a socket for mating with the male end 26 of the socket retaining tool 10 shown in FIG. 1.

As with the quick change adapter 22, the extension shaft 62 has the extension male end bore 90 for receiving the extension retainer pin 88 and connecting to the socket 11, and the extension female end bore 92 for receiving the first retainer pin 32 and connecting to the male end 26 of the socket retaining tool 10. Thus, the extension shaft assembly 60 operates similarly to the retaining tool 10, including the provisions of the extension keeper sleeve 70, the extension chamber spring 68, the extension press ring 82, and the extension retainer pin 88.

When the extension shaft 62 is released and moves to the right relative to the extension keeper sleeve 70 by the relaxing action of the extension chamber spring 68, the extension male end 84 is fully enclosed within the extension first chamber 72 of the extension keeper sleeve 70. At this point, the extension retainer pin 88 is securely captured within the extension first chamber 72, and the socket 11 remains locked onto the extension shaft 62. As similarly are with the socket and driver locking mechanisms, an extension locking mechanism comprises the extension retainer pin 88, the extension male end 84 of the extension shaft 62, and the extension keeper sleeve 70.

Figure 10B:
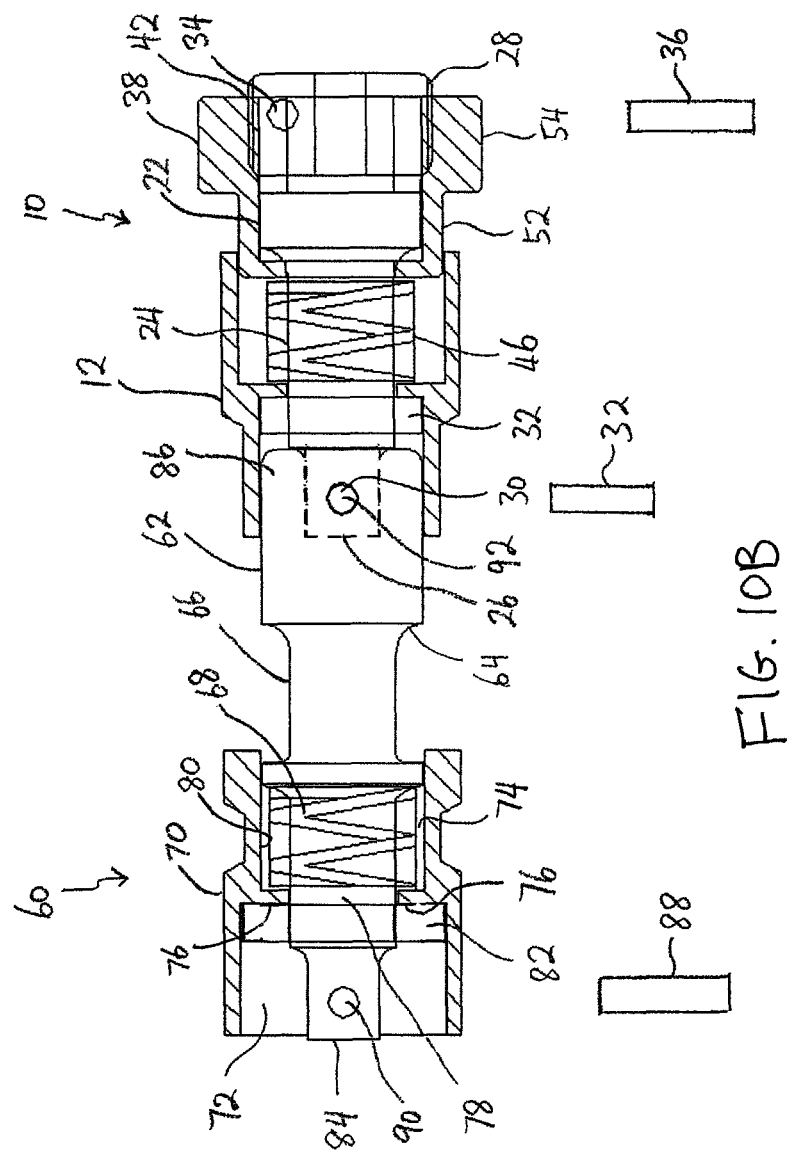
FIG. 10B is a vertical cross sectional view of the present socket retaining tool being connected to the extension shaft assembly of FIG. 10A.

Referring now to FIGS. 1 and 10B, variations of the FIGS. 1 and 10A embodiments are also contemplated. As discussed above, to increase reach of the driving tool in the confined or restricted areas, the extension shaft assembly 60 may be attached to the male end 26 of the quick change adapter 22 using the retainer pin 32 being simultaneously inserted into the male end bore 30 and the extension female end bore 92 for being securely retained or held in place by inner surfaces of the first chamber 14 of the keeper sleeve 12. The extension male end 84 of the extension shaft 62 provides similar functions as the quick change adapter 22. The socket 11 and the extension shaft assembly 60 can be serially connected to provide adequate reach in such confined areas. It is also contemplated that extension assemblies 60 with differing lengths of the extension shaft 62 may be provided to accommodate different reach requirements. Also, the internal diameters of the extension first and second chambers 72, 74 can be varied on different extension assemblies 60 to accommodate sockets 11 having differently sized external diameters. Similarly, the first and second chambers 14, 16 can have different internal diameters to accommodate connecting parts having differently sized external diameters.

Referring now to FIGS. 10B and 10C, when the extension shaft assembly 60 is attached to the socket retaining tool 10 in the relaxed position as described above, the first retainer pin 32 is substantially or entirely encapsulated inside of the first chamber 14 of the keeper sleeve 12 such that the extension shaft 62 of the extension shaft assembly 60 cannot be disconnected from the quick change adapter 22 of the socket retaining tool during unwanted movement of the tools. Similarly, the second retainer pin 36 is substantially or entirely encapsulated inside of the second opening 42 of the quick change sleeve 38, and the extension retainer pin 88 is substantially or entirely encapsulated inside of the first extension chamber 72 of the extension keeper sleeve 70. Although one exemplary variation is shown in FIG. 10C, other variations of the FIGS. 1 and 10A embodiments are contemplated to suit different applications.

While preferred embodiments of the disclosure have been herein illustrated and described, it is to be appreciated that certain changes, rearrangements and modifications may be made therein without departing from the scope of the disclosure and as set forth in the following claims.

What is claimed is:

1. A socket retaining tool for preventing separation of a socket from a drive shaft of a driving tool, comprising:
a keeper sleeve configured to accommodate insertion and reciprocal movement of a quick change adapter and a quick change sleeve under the action of a biasing member,
the quick change adapter having a male end and an opposite female end, the male and female ends constructed and arranged to be used with locking mechanisms such that the socket is connected to the male end of the quick change adapter using a socket locking mechanism, and the drive shaft of the driving tool is connected to the female end of the quick change adapter using a driver locking mechanism,
wherein the socket locking mechanism coupled to the male end is enclosed by the keeper sleeve, and the driver locking mechanism coupled to the female end is enclosed by the quick change sleeve, and
wherein the socket locking mechanism is positioned adjacent to a first longitudinally outermost portion of the male end relative to a longitudinal axis of the quick change adapter and the socket locking mechanism is substantially fully enclosed by the keeper sleeve, and the driver locking mechanism is positioned adjacent to a second longitudinally outermost portion of the female end relative to the longitudinal axis of the quick change adapter and the driver locking mechanism is substantially fully enclosed by the quick change sleeve when the socket retaining tool and the biasing member are in a relaxed position, thereby avoiding unwanted release of the locking mechanisms,
wherein the socket locking mechanism comprises a first retainer pin and a pin receptacle in the male end of the quick change adapter, and the driver locking mechanism comprises a second retainer pin and a pin receptacle in the female end of the quick change adapter.

2. The socket retaining tool of claim 1, wherein the keeper sleeve has a first chamber and an opposite second chamber, the first chamber being connected to the second chamber via an opening such that both chambers receive an elongate body of the quick change adapter.

3. The socket retaining tool of claim 2, wherein the socket retaining tool transitions from the relaxed position into a first compressed position by depressing the quick change sleeve into the second chamber of the keeper sleeve while the quick change adapter remains stationary relative to the keeper sleeve, and into a second compressed position by depressing the quick change sleeve and the quick change adapter together into the second chamber of the keeper sleeve.

4. The socket retaining tool of claim 2, wherein the first and second chambers are separated by a stop wall such that the stop wall is sandwiched by the first and second chambers, and the stop wall has a central opening and extends radially from an inner surface of the keeper sleeve toward a longitudinal axis of the keeper sleeve to separate the first and second chambers; and
wherein the biasing member is located and sized to fit in the second chamber, and an exterior diameter of the biasing member is larger than an interior diameter of the central opening of the stop wall so that the biasing member abuts against the stop wall in the second chamber.

5. The socket retaining tool of claim 4, further comprising a press ring having an internal diameter that is slightly smaller than an exterior diameter of the elongate body of the quick change adapter such that the press ring is fixedly disposed on the elongate body of the quick change adapter near the male end and retained thereon with an interference fit, and the press ring engages the stop wall in the first chamber to keep the quick change adapter in the first and second chambers when the biasing member is in the relaxed position,
wherein, for axial movement of the quick change adapter within the keeper sleeve, an exterior diameter of the press ring is slightly smaller than an interior diameter of the first chamber so that the press ring slidably reciprocates with the quick change adapter within the first chamber.

6. The socket retaining tool of claim 1, wherein the pin receptacle of the socket locking mechanism comprises a first retainer pin received in a male end cross bore disposed at the male end of the quick change adapter, and the pin receptacle of the driver locking mechanism comprises a second retainer pin received in a female end cross bore disposed at the female end of the quick change adapter.

7. The socket retaining tool of claim 6, wherein an inner surface of the quick change sleeve encloses the female end of the quick change adapter, covering the female end cross bore, when the socket retaining tool is in the relaxed position.

8. The socket retaining tool of claim 6, wherein an inner surface of the first chamber of the keeper sleeve encloses the male end of the quick change adapter, covering the male end cross bore, when the socket retaining tool is in the relaxed position.

9. The socket retaining tool of claim 1, wherein the quick change sleeve has a first opening configured for accommodating axial movement of the male end of the quick change adapter within the first opening, and a second opening configured for accommodating axial movement of the female end of the quick change adapter within the second opening.

10. The socket retaining tool of claim 9, wherein the first opening of the quick change sleeve is smaller than the second opening of the quick change sleeve and an exterior diameter of the female end of the quick change adapter, such that the female end of the quick change adapter is prevented from entering into the first opening of the quick change sleeve.

11. The socket retaining tool of claim 1, wherein an exterior diameter of a first region of the quick change sleeve is smaller than an interior diameter of the second chamber so that the first region slidably reciprocates within the second chamber, and an exterior diameter of a second region of the quick change sleeve is larger than an interior diameter of the second chamber so that the second region limits the axial reciprocating movement of the quick change sleeve relative to the keeper sleeve.

12. A socket retaining tool for preventing separation of a socket from a drive shaft of a driving tool, comprising:
a keeper sleeve configured to accommodate insertion and reciprocal movement of a quick change adapter and a quick change sleeve under the action of a biasing member,
the quick change adapter having a male end and an opposite female end, the male and female ends constructed and arranged to be used with locking mechanisms such that the socket is connected to the male end of the quick change adapter using a socket locking mechanism, and the drive shaft of the driving tool is connected to the female end of the quick change adapter using a driver locking mechanism,
wherein the socket locking mechanism coupled to the male end is enclosed by the keeper sleeve, and the driver locking mechanism coupled to the female end is enclosed by the quick change sleeve, and
wherein the socket locking mechanism is positioned adjacent to a first longitudinally outermost portion of the male end relative to a longitudinal axis of the quick change adapter and the socket locking mechanism is substantially fully enclosed by the keeper sleeve, and the driver locking mechanism is positioned adjacent to a second longitudinally outermost portion of the female end relative to the longitudinal axis of the quick change adapter and the driver locking mechanism is substantially fully enclosed by the quick change sleeve when the socket retaining tool and the biasing member are in a relaxed position, thereby avoiding unwanted release of the locking mechanisms,
wherein an exterior perimeter of the female end of the quick change adapter is smaller than the interior perimeter of the second opening of the quick change sleeve so that the quick change sleeve slides over the female end of the quick change sleeve.

13. A socket retaining tool for preventing separation of a socket from a drive shaft of a driving tool, comprising:
a keeper sleeve configured to accommodate insertion and reciprocal movement of a quick change adapter and a quick change sleeve under the action of a biasing member,
the quick change adapter having a male end and an opposite female end, the male and female ends constructed and arranged to be used with locking mechanisms such that the socket is connected to the male end of the quick change adapter using a socket locking mechanism, and the drive shaft of the driving tool is connected to the female end of the quick change adapter using a driver locking mechanism,
wherein the socket locking mechanism coupled to the male end is enclosed by the keeper sleeve, and the driver locking mechanism coupled to the female end is enclosed by the quick change sleeve, and
wherein the socket locking mechanism is positioned adjacent to a first longitudinally outermost portion of the male end relative to a longitudinal axis of the quick change adapter and the socket locking mechanism is substantially fully enclosed by the keeper sleeve, and the driver locking mechanism is positioned adjacent to a second longitudinally outermost portion of the female end relative to the longitudinal axis of the quick change adapter and the driver locking mechanism is substantially fully enclosed by the quick change sleeve when the socket retaining tool and the biasing member are in a relaxed position, thereby avoiding unwanted release of the locking mechanisms, and
further comprising an extension shaft assembly sandwiched between the socket and the socket retaining tool for providing increased reach of the driving tool, the extension shaft assembly including an extension keeper sleeve configured to accommodate insertion and reciprocal movement of an extension shaft under the action of an extension biasing member,
the extension shaft having an extension male end, an opposite extension female end, the extension male and female ends constructed and arranged to be used with locking mechanisms such that the extension male end of the extension shaft is connected to the socket using an extension locking mechanism, and the extension female end of the extension shaft is connected to the male end of the quick change adapter using the socket locking mechanism,
wherein the extension locking mechanism coupled to the extension male end is enclosed by the extension keeper sleeve, and the socket locking mechanism coupled to the extension female end is enclosed by the keeper sleeve, when the extension shaft assembly and the extension biasing member are in a relaxed position.

14. The socket retaining tool of claim 13, wherein the extension locking mechanism comprises a third retainer pin, the extension male end of the extension shaft, and the extension keeper sleeve.

15. The socket retaining tool of claim 13, wherein the extension shaft includes a flange extending outwardly from an outer circumferential surface of an elongate body of the extension shaft for bearing against the extension biasing member.

16. The socket retaining tool of claim 13, wherein the extension keeper sleeve has a first extension chamber and an opposite second extension chamber, the first extension chamber being connected to the second extension chamber via an opening such that both extension chambers receive the extension shaft.

17. The socket retaining tool of claim 16, wherein the first and second extension chambers are separated by an extension stop wall such that the extension stop wall is sandwiched by the first and second extension chambers, and the extension stop wall has a central opening and extends radially from an inner surface of the extension keeper sleeve toward a longitudinal axis of the extension keeper sleeve to separate the first and second extension chambers; and wherein the extension biasing member is located and sized to fit in the second extension chamber, and an exterior diameter of the extension biasing member is larger than an interior diameter of the central opening of the extension stop wall so that the extension biasing member abuts against the extension stop wall.

18. The socket retaining tool of claim 16, further comprising an extension press ring having an internal diameter that is slightly smaller than an exterior diameter of the extension shaft so that the extension press ring is fixedly disposed on the extension shaft near the extension male end and retained thereon with an interference fit, and the extension press ring engages the extension stop wall in the extension first chamber to keep the extension shaft in the first and second extension chambers when the extension biasing member is in the relaxed position, wherein for axial movement of the extension shaft within the extension keeper sleeve, an exterior diameter of the extension press ring is slightly smaller than an interior diameter of the first extension chamber so that the extension press ring slidably reciprocates with the extension shaft within the first extension chamber.

\* \* \* \* \*